(12) United States Patent
Kim et al.

(10) Patent No.: US 12,432,039 B2
(45) Date of Patent: Sep. 30, 2025

(54) METHOD FOR DATA TRANSMISSION

(71) Applicant: SAMSUNG DISPLAY CO., LTD., Yongin-si (KR)

(72) Inventors: Heen Dol Kim, Yongin-si (KR); Jin Woo Noh, Yongin-si (KR); Jong Soo Kim, Yongin-si (KR); Chae Hee Park, Yongin-si (KR); Ji Ye Lee, Yongin-si (KR); Young Suk Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 523 days.

(21) Appl. No.: 17/891,508

(22) Filed: Aug. 19, 2022

(65) Prior Publication Data

US 2023/0128574 A1     Apr. 27, 2023

(30) Foreign Application Priority Data

Oct. 26, 2021     (KR) .................. 10-2021-0143938

(51) Int. Cl.
*H04L 7/00*     (2006.01)

(52) U.S. Cl.
CPC ............................ *H04L 7/0016* (2013.01)

(58) Field of Classification Search
CPC ........... G06F 13/4278; G09G 2330/06; G09G 5/006; G09G 5/008; H04L 7/0008; H04L 7/0016; H04L 7/033
See application file for complete search history.

(56) References Cited

U.S. PATENT DOCUMENTS

| | | | |
|---|---|---|---|
| 9,729,681 B2 | 8/2017 | Lee | |
| 10,615,956 B2* | 4/2020 | Kobayashi | H04L 27/06 |
| 12,125,459 B2* | 10/2024 | Kim | G09G 5/008 |
| 2012/0182273 A1 | 7/2012 | Ninomiya et al. | |
| 2015/0350389 A1* | 12/2015 | Lee | H04L 69/22 370/474 |
| 2017/0117979 A1 | 4/2017 | Sengoku et al. | |
| 2018/0041330 A1 | 2/2018 | Yim | |
| 2019/0288831 A1* | 9/2019 | Kobayashi | H04L 7/0334 |

(Continued)

FOREIGN PATENT DOCUMENTS

| | | | | |
|---|---|---|---|---|
| CN | 115865265 A * | 3/2023 | | G09G 5/008 |
| EP | 4174670 A1 * | 5/2023 | | G06F 13/4278 |

(Continued)

*Primary Examiner* — Eric Nowlin
(74) *Attorney, Agent, or Firm* — CANTOR COLBURN LLP

(57) ABSTRACT

A method for data transmission includes dividing first data into data packets, selecting transition acceleration data among transition acceleration data preliminary packets, generating transition guarantee data packets by performing an operation on a data packet group including predetermined data packets among the data packets and the transition acceleration data, and transmitting the transition acceleration data and the transition guarantee data packets. In the selecting the transition acceleration data among the transition acceleration data preliminary packets, the transition acceleration data different from previous transition acceleration data immediately preceding the transition acceleration data in the transition acceleration data preliminary packets is selected.

16 Claims, 10 Drawing Sheets

(56) References Cited

U.S. PATENT DOCUMENTS

| | | | | |
|---|---|---|---|---|
| 2023/0098067 A1* | 3/2023 | Kim | .................. | G09G 5/008 |
| | | | | 348/537 |
| 2023/0128574 A1* | 4/2023 | Kim | .................. | G09G 5/006 |
| | | | | 375/360 |

FOREIGN PATENT DOCUMENTS

| | | | | | |
|---|---|---|---|---|---|
| JP | 2019165316 | A | * | 9/2019 | ............ H04L 27/06 |
| KR | 100290732 | B1 | * | 6/2001 | |
| KR | 20050060885 | A | * | 6/2005 | |
| KR | 101235696 | B1 | | 2/2013 | |
| KR | 20230044078 | A | * | 9/2021 | |

* cited by examiner

METHOD FOR DATA TRANSMISSION

This application claims priority to Korean patent application 10-2021-0143938, filed on Oct. 26, 2021, and all the benefits accruing therefrom under 35 U.S.C. § 119, the content of which in its entirety is herein incorporated by reference.

BACKGROUND

1. Field

Embodiments of the invention generally relate to a method for data transmission.

2. Description of the Related Art

As interest in information displays and demand for portable information media increase, research and commercialization are being focused on display devices.

A transceiver used to perform communication in a display device is of a clock embedded type having no separate clock line, and a transition (or change) of data, such as 0 to 1, or 1 to 0, is desired for the purpose of clock data recovery.

SUMMARY

Embodiments provide a method for data transmission, which may reduce an electro-magnetic interference ("EMI") phenomenon in data transmission.

In an embodiment of the invention, there is provided a method for data transmission, the method including dividing first data into data packets, selecting transition acceleration data among transition acceleration data preliminary packets, generating transition guarantee data packets by performing an operation on a data packet group including predetermined data packets among the data packets and the transition acceleration data, and transmitting the transition acceleration data and the transition guarantee data packets. In the selecting the transition acceleration data among the transition acceleration data preliminary packets, the transition acceleration data different from previous transition acceleration data immediately preceding the transition acceleration data in the transition acceleration data preliminary packets is selected.

In an embodiment, the transition acceleration data preliminary packets may include all transition acceleration data which are represented by n bits where n is a natural number greater than one.

In an embodiment, transition acceleration data which is firstly selectable among the transition acceleration data preliminary packets along a predetermined scan direction may be selected by scanning the transition acceleration data preliminary packets.

In an embodiment, the transition acceleration data preliminary packets may be scanned in an order from a transition acceleration data preliminary packet having a smallest value among the transition acceleration data preliminary packets to a transition acceleration data preliminary packet having a largest value among the transition acceleration data preliminary packets.

In an embodiment, the transition acceleration data preliminary packets may be scanned in an order from a transition acceleration data preliminary packet having a largest value among the transition acceleration data preliminary packets to a transition acceleration data preliminary packet having a smallest value among the transition acceleration data preliminary packets.

In an embodiment, the transition acceleration data preliminary packets may be grouped, the grouped transition acceleration data preliminary packets may be aligned in a predetermined order, and then the aligned transition acceleration data preliminary packets may be scanned.

In an embodiment, the transition acceleration data preliminary packets may be grouped, the grouped transition acceleration data preliminary packets may be aligned in a predetermined order, and then the aligned transition acceleration data preliminary packets may be scanned in an order from a transition acceleration data preliminary packet having a smallest value in a group of the transition acceleration data preliminary packets to a transition acceleration data preliminary packet having a largest value in the group of the transition acceleration data preliminary packets.

In an embodiment, the transition acceleration data preliminary packets may be grouped, the grouped transition acceleration data preliminary packets may be aligned in a predetermined order, and then the aligned transition acceleration data preliminary packets may be scanned in an order from a transition acceleration data preliminary packet having a largest value in a group of the transition acceleration data preliminary packets to a transition acceleration data preliminary packet having a smallest value in the group of the transition acceleration data preliminary packets.

In an embodiment, the transition guarantee data packets may be generated by performing an exclusive OR gate operation on the data packet group and the transition acceleration data.

In an embodiment, the transition acceleration data may not be equal and complementary to the data packets.

In another embodiment of the invention, there is provided a method for data transmission, the method including dividing first data into data packets, selecting first transition acceleration data among transition acceleration data preliminary packets, generating first transition guarantee data packets by performing an operation on a first data packet group including predetermined data packets among the data packets and the first transition acceleration data, transmitting the first transition acceleration data and the first transition guarantee data packets, selecting second transition acceleration data among the transition acceleration data preliminary packets, generating second transition guarantee data packets by performing an operation on a second data packet group including predetermined data packets among the data packets and the second transition acceleration data, and transmitting the second transition acceleration data and the second transition guarantee data packets.

In an embodiment, the first transition acceleration data and the second transition acceleration data may be different from each other.

Transition acceleration data which is firstly selectable among the transition acceleration data preliminary packets along a predetermined scan direction may be selected by scanning the transition acceleration data preliminary packets.

In an embodiment, the first transition acceleration data may be selected by scanning the transition acceleration data preliminary packets in an order from a transition acceleration data preliminary packet having a smallest value among the transition acceleration data preliminary packets to a transition acceleration data preliminary packet having a largest value among the transition acceleration data preliminary packets.

In an embodiment, the second transition acceleration data may be selected by scanning the transition acceleration data preliminary packets in an order from a transition acceleration data preliminary packet having a largest value among the transition acceleration data preliminary packets to a transition acceleration data preliminary packet having a smallest value among the transition acceleration data preliminary packets.

In an embodiment, the transition acceleration data preliminary packets may be grouped, the grouped transition acceleration data preliminary packets may be aligned in a predetermined order, and then the aligned transition acceleration data preliminary packets may be scanned.

In an embodiment, in the aligned transition acceleration data preliminary packets, the first transition acceleration data may be selected by scanning the transition acceleration data preliminary packets in an order from a transition acceleration data preliminary packet having a smallest value in a first group of the transition acceleration data preliminary packets to a transition acceleration data preliminary packet having a largest value in the first group of the transition acceleration data preliminary packets.

In an embodiment, in the aligned transition acceleration data preliminary packets, the second transition acceleration data may be selected by scanning the transition acceleration data preliminary packets in an order from a transition acceleration data preliminary packet having a largest value in a second group of the transition acceleration data preliminary packets to a transition acceleration data preliminary packet having a smallest value in the second group of the transition acceleration data preliminary packets.

In an embodiment, a number of the transition acceleration data preliminary packets may be $2^{(n-1)}$, when one data packet among the data packets consists of n-bit data where n is a natural number greater than one.

In an embodiment, a number of the data packets included in one data packet group among the first and second data packet groups may be $2^{(n-1)}-1$, when one data packet among the data packets consists of n-bit data where n is a natural number greater than one.

BRIEF DESCRIPTION OF THE DRAWINGS

Embodiments will now be described more fully hereinafter with reference to the accompanying drawings, in which.

DETAILED DESCRIPTION

Figure 1:
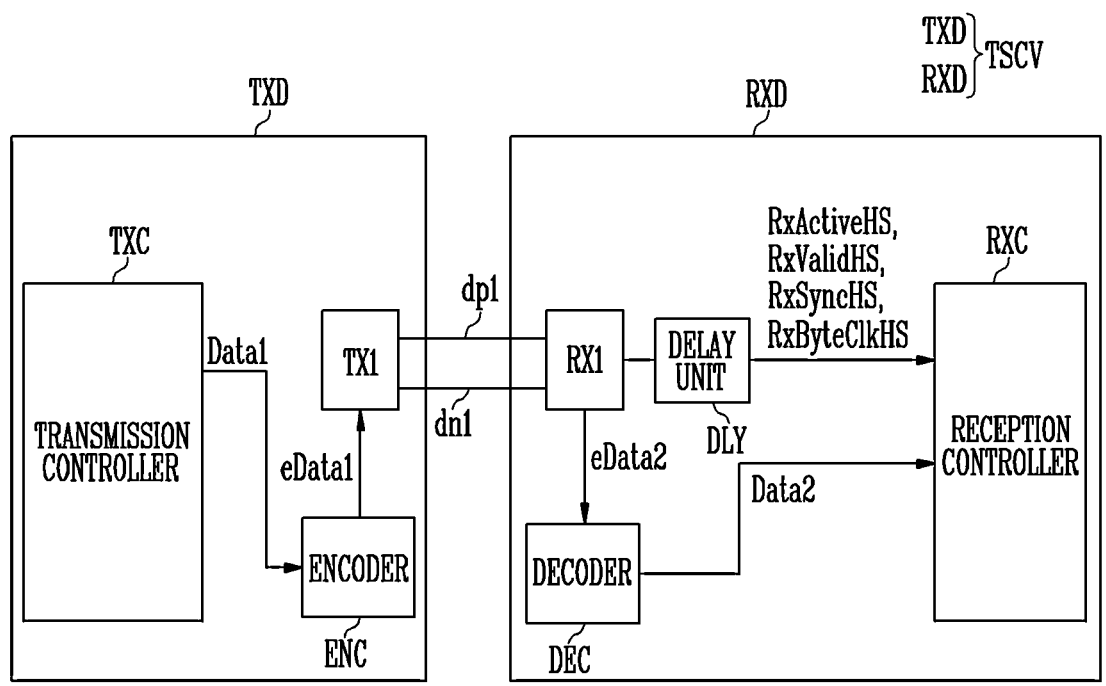
FIGS. 1 and 2 are diagrams illustrating an embodiment of a transceiver for data transmission in accordance with the invention.

Embodiments of the invention may apply various changes and different shape, therefore only illustrate in details with particular examples. However, the examples do not limit to certain shapes but apply to all the change and equivalent material and replacement. The drawings included are illustrated a fashion where the drawing figures are expanded for the better understanding.

Embodiments may be embodied in different forms and should not be construed as limited to the embodiments set forth herein. Rather, these embodiments are provided so that this invention will be thorough and complete, and will fully convey the scope of the embodiments to those skilled in the art.

In the drawing figures, dimensions may be exaggerated for clarity of illustration. It will be understood that when an element is also referred to as being "between" two elements, it may be the only element between the two elements, or one or more intervening elements may also be present. Like reference numerals refer to like elements throughout.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the invention. As used herein, the singular forms are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, a method for data transmission in an embodiment of the invention with reference to the accompanying drawings.

Figure 2:
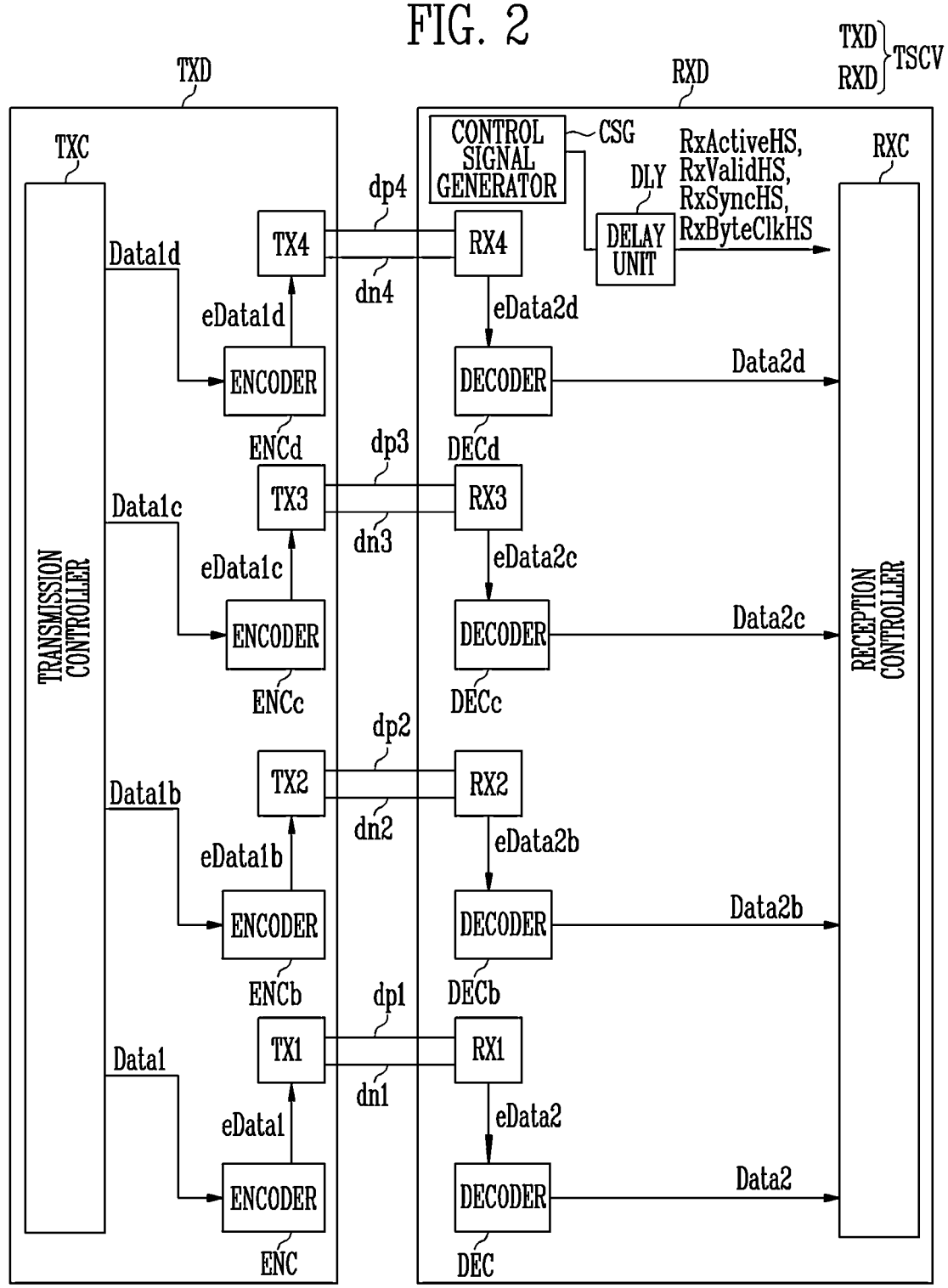

FIGS. 1 and 2 are diagrams illustrating an embodiment of a transceiver for data transmission in accordance with the invention.

Referring to FIGS. 1 and 2, the transceiver TSCV for data transmission and data recovery in the embodiment of the invention may include a transmitter TXD and a receiver RXD.

The transmitter TXD may include a transmission controller TXC, a first data transmission unit TX1, and an encoder ENC. The receiver RXD may include a reception controller RXC, a first data reception unit RX1, a decoder DEC, and a delay unit DLY. In an embodiment, the delay unit DLY may include a buffer but is not limited thereto.

The first data transmission unit TX1 may be connected to the first data reception unit RX1 through a first line dp1 and a second line dn1. The first data transmission unit TX1 and the first data reception unit RX1 may be also referred to as a first data channel. The first data transmission unit TX1 and the first data reception unit RX1 may correspond to a physical layer and a datalink layer in an open system interconnection ("OSI") 7-layer model, correspond to a network interface of a transmission control protocol/internet protocol ("TCP/IP") protocol, or correspond to a physical layer of a mobile industry processor interface ("MIPI") protocol. The physical layer of the MIPI protocol may be configured according to various predetermined specifications such as D-PHY, C-PHY, and M-PHY. Hereinafter, a case where the first data transmission unit TX1 and the first data reception unit RX1 are configured according to a D-PHY specification in the physical layer of the MIPI protocol will be described as one of embodiments.

The transmission controller TXC and the reception controller RXC may correspond to a network layer and a transport layer in the OSI 7-layer model, correspond to internet and transport of the TCP/IP protocol, or correspond to a protocol layer of the MIPI protocol. The protocol layer of the MIPI protocol may be configured according to various predefined specifications such as a display serial interface ("DSI") and a camera serial interface ("CSI"). Hereinafter, a case where the transmission controller TXC and the reception controller RXC are configured according to a DSI specification in the protocol layer of the MIPI protocol.

The transmission controller TXC, the first data transmission unit TX1, and the encoder ENC may be components separated from each other in a hardware manner, and two or more of the transmission controller TXC, the first data transmission unit TX1, and the encoder ENC may be integrated in a hardware manner. The transmission controller TXC, the first data transmission unit TX1, and the encoder ENC may be components separated from each other in a software manner, and two or more of the transmission controller TXC, the first data transmission unit TX1, and the encoder ENC may be integrated in a software manner. The transmitter TXD may be configured as a portion (hardware or software) of another controller (e.g., an application processor ("AP"), a graphic processing unit ("GPU"), a central processing unit ("CPU"), or the like), and be configured as independent hardware (e.g., a transmission dedicated IC).

The reception controller RXC, the first data reception unit RX1, the decoder DEC, and the delay unit DLY may be components separated from each other in a hardware manner, and two or more of the reception controller RXC, the first data reception unit RX1, the decoder DEC, and the delay unit DLY may be integrated in a hardware manner. The reception controller RXC, the first data reception unit RX1, the decoder DEC, and the delay unit DLY may be components separated from each other in a software manner, and two or more of the reception controller RXC, the first data reception unit RX1, the decoder DEC, and the delay unit DLY may be integrated in a software manner. The receiver RXD may be configured as a portion (hardware or software) of another controller (e.g., a timing controller ("TCON"), an Embedded driver IC ("TED"), a driver IC ("D-IC"), or the like), and be configured as independent hardware (e.g., a reception dedicated IC).

The transmission controller TXC may provide the encoder ENC with first data Data1 (or a third payload) including an original payload.

The encoder ENC may generate first encoded data eData1 including a first payload (i.e., an encoded payload) by encoding the first data Data1, and provide the first encoded data eData1 to the first data transmission unit TX1.

The first data transmission unit TX1 may transmit data by adding another data to the front/rear of the first encoded data eData1 according to a predetermined protocol.

The first data reception unit RX1 may generate a clock signal by the first encoded data eData1, and sample data received through the first line dp1 and the second line dn1 with respect to the generated clock signal. In an embodiment, the first data reception unit RX1 may include a clock data recovery circuit ("CDR"), a de-serializer ("DES"), a register ("REG"), or the like, for example. The first data reception unit RX1 may provide the decoder DEC with second encoded data eData2 including the same payload as the first encoded data eData1. The decoder DEC may generate second data Data2 including the same payload as the first data Data1 by decoding the second encoded data eData2, and provide the second data Data2 to the reception controller RXC.

The first data reception unit RX1 may generate a plurality of control signals RxActiveHS, RxvalidHS, RxSyncHS, and RxByteClkHS desired according to a protocol. The delay unit DLY may delay, by a decoding time, the plurality of control signals RxActiveHS, RxvalidHS, RxSyncHS, and RxByteClkHS, and provide the delayed control signals to the reception controller RXC. The decoding time may be a time desired for the decoder DEC to generate the second data Data2 by decoding the second encoded data eData2.

In addition, a control signal RxByteClkHS among the plurality of control signals RxActiveHS, RxvalidHS, RxSyncHS, and RxByteClkHS may be a clock signal for notifying a data transmission unit as a byte unit. In an embodiment, this means that one byte of the second data Data2 is transmitted for every cycle of the control signal RxByteClkHS, for example. Also, the control signal RxByteClkHS may be a clock signal used for data processing in the reception controller RXC. In an embodiment, the control signal RxByteClkHS may be a total system clock for data processing after the de-serializer, for example.

Although a case where the transceiver TSCV shown in FIG. 1 is configured with one data channel is exemplified, the transceiver TSCV may be configured with a plurality of data channels (e.g., four data channels) as shown in FIG. 2.

Referring to FIG. 2, the transmitter TXD may further include second to fourth data transmission units TX2, TX3, and TX4 and corresponding encoders ENCb, ENCc, and ENCd. The receiver RXD may include second to fourth data reception units RX2, RX3, and RX4 and corresponding decoders DECb, DECc, and DECd. Also, the receiver RXD may include a control signal generator CSG and the delay unit DLY.

The second data transmission unit TX2 may be connected to the second data reception unit RX2 through a first line dp2 and a second line dn2. The second data transmission unit TX2 and the second data reception unit RX2 may be collectively referred to as a second data channel. The third data transmission unit TX3 may be connected to the third data reception unit RX3 through a first line dp3 and a second line dn3. The third data transmission unit TX3 and the third data reception unit RX3 may be collectively referred to as a third data channel. The fourth data transmission unit TX4 may be connected to the fourth data reception unit RX4 through a first line dp4 and a second line dn4. The fourth data transmission unit TX4 and the fourth data reception unit RX4 may be collectively referred to as a fourth data channel. A plurality of data channels may transmit/receive data independent from each other.

Operations in which the encoders ENCb, ENCc, and ENCd generate encoded data eData1b, eData1c, and eData1d by encoding data Data1b, Data1c, and Data1d are substantially identical to an operation of the encoder ENC, and therefore, overlapping descriptions will be omitted.

Operations in which the decoders DECb, DECc, and DECd generate data Data2b, Data2c, and Data2d by decoding encoded data eData2b, eData2c, and eData2d are substantially identical to an operation of the decoder DEC, and therefore, overlapping descriptions will be omitted.

The control signal generator CSG may generate control signals RxActiveHS, RxValidHS, RxSyncHS, and RxByteClkHS by data received by the second to fourth data reception units RX2, RX3, and RX4. In an embodiment, the control signal generator CSG may align timings of the data received by the second to fourth data reception units RX2, RX3, and RX4, and generate the control signals RxActiveHS, RxValidHS, RxSyncHS, and RxByteClkHS, based on the aligned data, for example.

The delay unit DLY may delay, by a decoding time, the plurality of control signals RxActiveHS, RxvalidHS, RxSyncHS, and RxByteClkHS, and provide the delayed control signals to the reception controller RXC. The decoding time may be a time desired for the decoders DEC, DECb, DECc, and DECd to generate second data Data2, Data2b, Data2c, and Data2d by decoding second encoded data eData2, eData2b, eData2c, and eData2d, respectively. In an embodiment, when decoding timings of the decoders DEC, DECb, DECc, and DECd are different from each other, the delay unit DLY may delay the plurality of control signals RxActiveHS, RxvalidHS, RxSyncHS, and RxByteClkHS, based on the slowest decoding time, for example.

Hereinafter, the transmitter will be described with reference to FIGS. 3 and 4.

Figure 3:
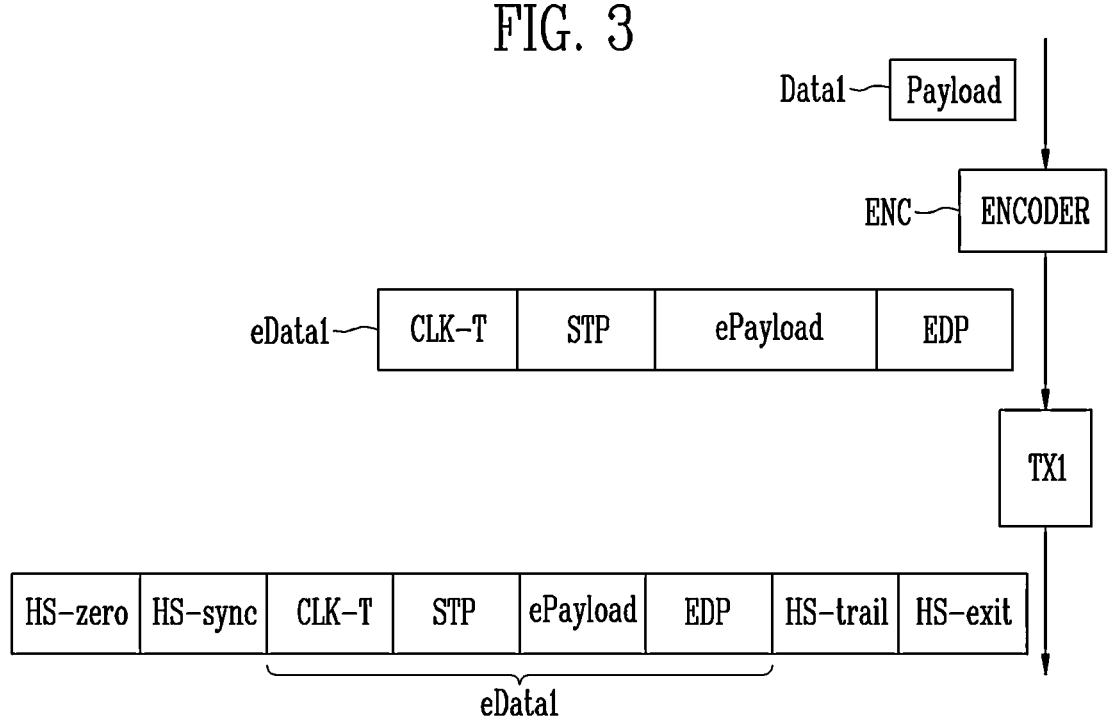
FIGS. 3 and 4 are diagrams illustrating an operation of a transmitter shown in FIGS. 1 and 2.
Figure 4:
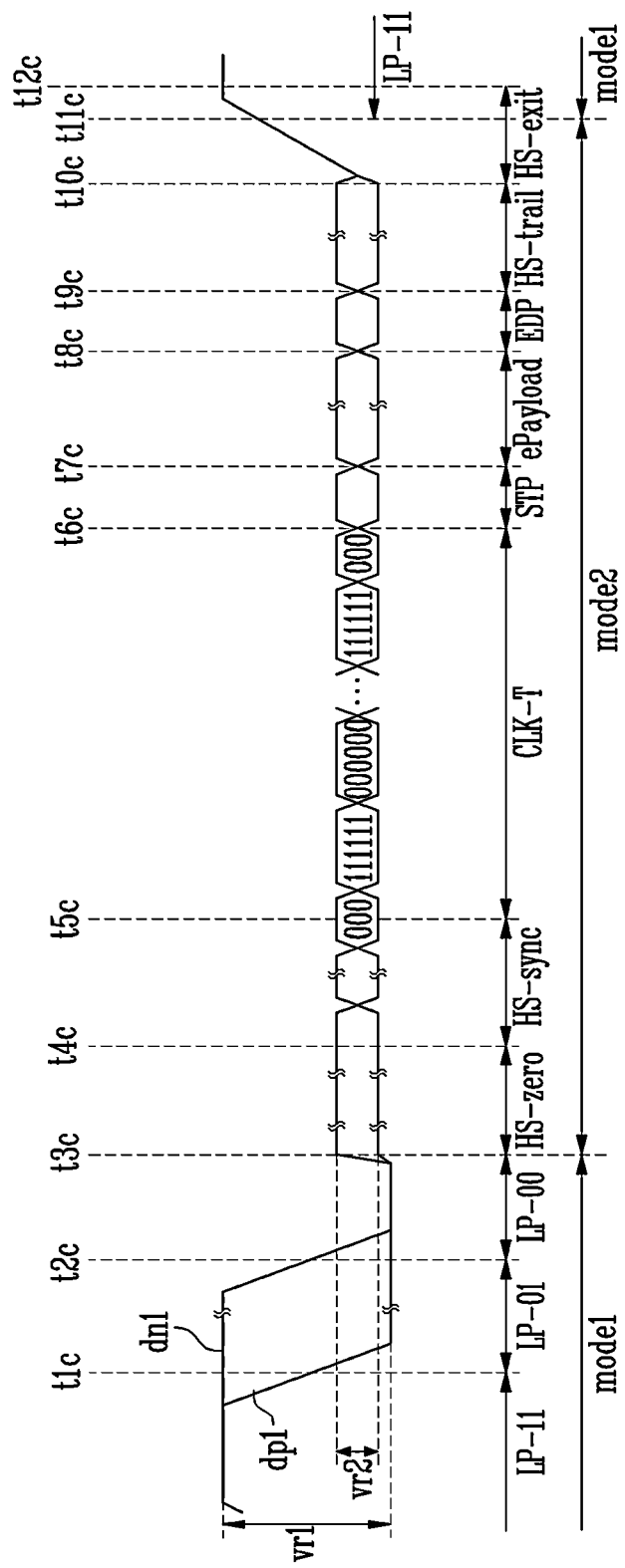

FIGS. 3 and 4 are diagrams illustrating an operation of the transmitter shown in FIGS. 1 and 2.

Referring to FIG. 3, the encoder ENC may receive first data Data1 including a third payload Payload. The encoder ENC may generate a first payload ePayload by encoding the third payload Payload, and generate first encoded data eData1 by adding data to the front/rear of the first payload ePayload. In an embodiment, the first encoded data eData1 may sequentially include a clock training pattern CLK-T, a start pattern STP, the first payload ePayload, and an end pattern EDP, for example.

The clock training pattern CLK-T may include clock information. The receiver RXD may generate a clock signal having a predetermined frequency and a predetermined phase by the clock information. In an embodiment, the clock training pattern CLK-T may be a pattern in which one 1 and one 0 are repeated (e.g., 01010101 . . . ), for example. A clock signal generated in the clock data recovery circuit of the receiver RXD may have a frequency and a phase, which are undesirably changed due to an external factor (noise, temperature, or the like). The receiver RXD may correct the frequency and phase of the clock signal by the clock training pattern CLK-T. In another embodiment, the clock training pattern CLK-T may repeatedly include a plurality of consecutive 0s and a plurality of consecutive 1s (e.g., 0000111100001111 . . . ). In an embodiment, frequency information and phase information, which are indicated by the clock training pattern CLK-T, may be changed according to a number of the plurality of consecutive 0s or the plurality of consecutive 1s.

The start pattern STP may be a pattern notifying a transmission start of the first payload ePayload. The start pattern STP may be a pattern which the first payload ePayload in an encoded state cannot include (i.e., of which use is inhibited). In an embodiment, the start pattern STP may consist of 24b'011100_000000_111111_110001', for example.

The first payload ePayload may include clock information. In an embodiment, when the number of the plurality of consecutive 0s becomes large in the third payload Payload or when the number of the plurality of consecutive 1s becomes large in the third payload Payload, the number of transitions of a signal becomes small, for example. Therefore, phase correction of a clock signal may not be sufficiently performed in the first data reception unit RX1, and a skew of the clock signal may occur. Accordingly, the encoder ENC may perform encoding such that the number of transitions (changing from 0 to 1 or changing from 1 to 0) of the first payload ePayload becomes large as compared with the third payload Payload. In an embodiment, the encoder ENC may perform encoding such that each transition guarantee data packet TGDP (refer to FIG. 7) included in the first payload ePayload has at least one transition. This will be described in detail with reference to FIGS. 7 to 10.

The end pattern EDP may be a pattern notifying a transmission end of the first payload ePayload. In an embodiment, the end pattern EDP may consist of 24b'011100_111111_000000_110001', for example. The end pattern EDP may be a pattern which the first payload ePayload in the encoded state cannot include (i.e., of which use is inhibited), for example.

The first data transmission unit TX1 may receive the first encoded data eData1 including the first payload ePayload. The first data transmission unit TX1 may transmit data by adding another data to the front/rear of the first encoded data eData1 according to a predetermined protocol. In an embodiment, when the predetermined protocol is the MIPI protocol, the first data transmission unit TX1 may sequentially transmit a zero pattern HS-zero, a sync pattern HS-sync, the first encoded data eData1, a trail pattern HS-trail, and an exit pattern HS-exit, for example.

Referring to FIG. 4, in a first mode mode1, the transmitter TXD (particularly, the first data transmission unit TX1) (refer to FIGS. 1 and 2) may transmit signals having a first voltage range vr1 to the first line dp1 and the second line dn1. In a second mode mode2, the transmitter TXD may transmit signals having a second voltage range vr2 smaller than the first voltage range vr1 to the first line dp1 and the second line dn1.

In an embodiment, an upper limit of the first voltage range vr1 may be greater than an upper limit of the second voltage range vr2, and a lower limit of the first voltage range vr1 may be smaller than a lower limit of the second voltage range vr2, for example. When the MIPI protocol is applied to the transceiver TSCV, the first mode mode1 may be a low power ("LP") mode, and the second mode mode2 may be a high speed ("HS") mode.

In the first mode mode1, the first line dp1 and the second line dn1 may be used in a single-ended manner. That is, in the first mode mode1, signals respectively transmitted to the first line dp1 and the second line dn1 may be equal to each other or be different from each other. In the second mode mode2, the first line dp1 and the second line dn1 may be used in a differential manner. That is, in the second mode mode2, signals respectively transmitted to the first line dp1 and the second line dn1 may be different from each other. The first line dp1 may be a positive line, and the second line dn1 may be a negative line.

When the transmitter TXD transmits the first payload ePayload to the receiver RXD, the transmitter TXD may be sequentially driven in the first mode mode1, the second mode mode2, and the first mode mode1, and transmit the clock training pattern CLK-T and the first payload ePayload in the second mode mode2.

The transmitter TXD may transmit pre-defined patterns (e.g., a pattern LP-11, a pattern LP-01, and a pattern LP-00) to the first line dp1 and the second line dn1 so as to notify that the mode of the transmitter TXD is changed from the first mode mode1 to the second mode mode2.

In an embodiment, before a time point t1c, the transmitter TXD may maintain signals applied to the first line dp1 and the second line dn1 to have a logic high level (i.e., the pattern LP-11), for example. When the voltage level of the signal is higher than a pre-defined first threshold voltage level, the voltage level may be determined as the logic high level. When the voltage level of the signal is lower than a pre-defined second threshold voltage level, the voltage level may be determined as a logic low level. Next, at the time point t1c, the transmitter TXD may change the signal of the first line dp1 to have the logic low level, and maintain the signal of the second line dn1 to have the logic high level (i.e., the pattern LP-01). Next, at a time point t2c, the transmitter TXD may maintain the signal of the first line dp1 to have the logic low level, and change the signal of the second line dn1 to have the logic low level (i.e., the pattern LP-00).

Next, in the second mode mode2, the transmitter TXD may sequentially transmit the zero pattern HS-zero, the sync pattern HS-sync, the first encoded data eData1, the trail pattern HS-trail, and the exit pattern HS-exit, which are described above. In an embodiment, the transmitter TXD may transmit the zero pattern HS-zero during a period from a time point t3c to a time point t4c, transmit the sync pattern HS-sync during a period from a time point t4c to a time point t5c, transmit the clock training pattern CLK-T during a period from a time point t5c to a time point t6c, transmit the start pattern STP during a period from a time point t6c to a time point t7c, transmit the first payload ePayload during a period from a time point t7c to a time point t8c, transmit the end pattern EDP during a period from a time point t8c to a time point t9c, transmit the trail pattern HS-trail during a period from a time point t9c to a time point t10c, and transmit the exit pattern HS-exit after a time point t10c, for example.

The zero pattern HS-zero may be a pattern notifying a standby period after the transmitter TXD enters into the second mode mode2 from the first mode mode1. In an embodiment, the zero pattern HS-zero may be a pattern in which 0 is repeated, for example.

The sync pattern HS-sync may be a pattern notifying a transmission start of the first encoded data eData1. In an embodiment, the sync pattern HS-sync may have a value of 0xB8h or a value of 0001101, for example.

The trail pattern HS-trail may be a pattern notifying a transmission end of the first encoded data eData1. The trail pattern HS-trail may be a pattern in which a value opposite to last data of the first encoded data eData1 is repeated. In an embodiment, when the last data (bit) of the first encoded data eData1 is 0, the trail pattern HS-trail may be a pattern in which 1 is repeated, for example. In an embodiment, when the last data (bit) of the first encoded data eData1 is 1, the trail pattern HS-trail may be a pattern in which 0 is repeated, for example.

The exit pattern HS-exit may be a pattern notifying that the second mode mode2 is ended and the first mode mode1 is started. The exit pattern HS-exit does not consist of a particular bit, but may a transitional pattern in which a voltage increases to exceed the second voltage range vr2.

From a time point t11c, the transmitter TXD may change the signals applied to the first line dp1 and the second line dn1 to have the logic high level (i.e., the pattern LP-11). Accordingly, the transmitter TXD may notify that the second mode mode2 is ended and the first mode mode1 is started.

The receiver RXD may generate a clock signal by the clock training pattern CLK-T and the first payload ePayload. The first data reception unit RX1 may include a clock data recovery circuit CDR (refer to FIG. 6), and generate a clock signal having a predetermined frequency and a predetermined phase by the clock training pattern CLK-T. Also, the first data reception unit RX1 may continuously correct the phase of the clock signal to prevent a skew of the clock signal by the first encoded data eData1. The first data reception unit RX1 may sample received data by the generated clock signal. Thus, the transceiver TSCV capable of performing communication by the MIPI protocol without any clock line may be provided.

Hereinafter, the receiver will be described with reference to FIGS. 5 and 6.

Figure 5:
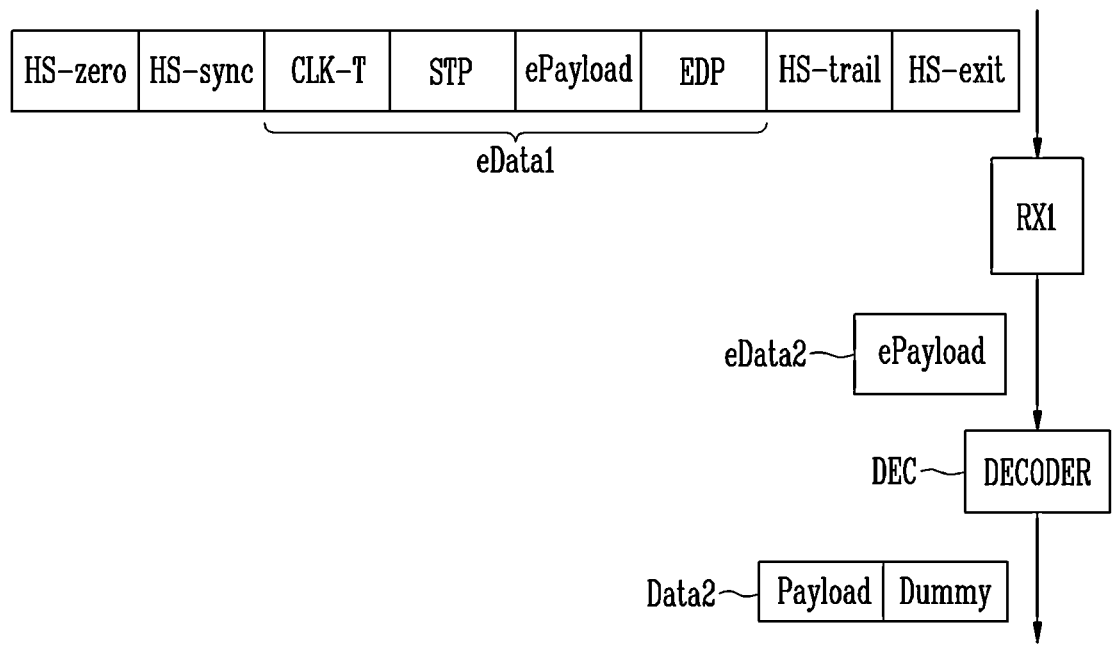
FIG. 5 is a diagram illustrating an embodiment of an operation of a receiver in accordance with the invention.

FIG. 5 is a diagram illustrating an embodiment of an operation of the receiver in accordance with the invention. FIG. 6 is a diagram illustrating an embodiment of a configuration of the receiver in accordance with the invention. Hereinafter, the receiver will be described with reference to FIGS. 1 to 4 together.

Referring to FIG. 5, the first data reception unit RX1 may provide the decoder DEC with second encoded data eData2 including a first payload ePayload among received data.

The decoder DEC may generate second data Data2 by decoding the second encoded data eData2 (i.e., the first payload ePayload), and provide the generated second data Data2 to the reception controller RXC. The second data Data2 may include a second payload Payload and a dummy pattern Dummy. The second payload Payload is equal to the third payload of the first data Data1 provided from the transmission controller TXC.

The dummy pattern Dummy may be one pre-encoded to be embedded into the first payload ePayload in the encoder ENC, and be one added in the decoder DEC. The dummy pattern Dummy may be data in which the same value is repeated. In an embodiment, when a last value of the second payload Payload is 0, the dummy pattern Dummy may be data in which 1 is repeated, for example. When the last value of the second payload Payload is 1, the dummy pattern Dummy may be data in which 0 is repeated.

Figure 6:
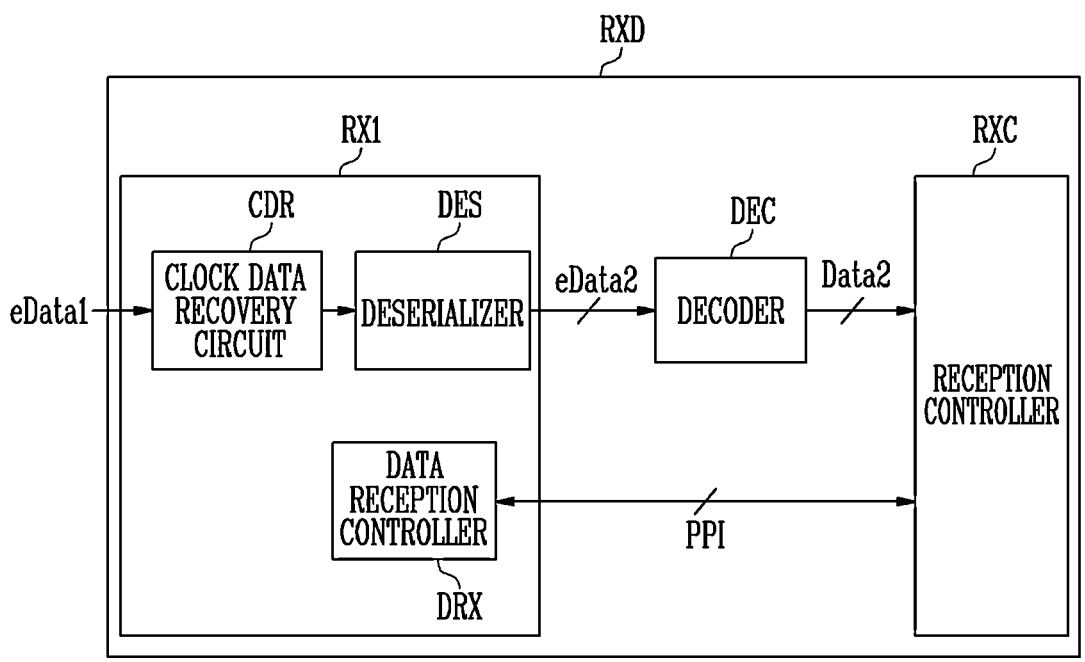
FIG. 6 is a diagram illustrating an embodiment of a configuration of the receiver in accordance with the invention.

Referring to FIG. 6, the first data reception unit RX1 may include a clock data recovery circuit CDR, a de-serializer DES, and a data reception controller DRX.

The clock data recovery circuit CDR may generate a clock signal corresponding to a received clock training pattern. That is, the clock data recovery circuit CDR may generate frequency information and phase information of the received training pattern. In an embodiment, the clock data recovery circuit CDR may receive a first clock training pattern, and generate a first clock signal by first frequency information and first phase information of the first clock training pattern, for example.

The de-serializer DES may convert data output from a phase detector into a bus signal and then output the bus signal. In an embodiment, the de-serializer DES may convert the data output from the phase detector into a bus signal of 2:24, for example.

The data reception controller DRX may be an analog logic capable of communicating with the reception controller RXC. The data reception controller DRX may communicate with the reception controller RXC through a PHY protocol interface PPI.

Hereinafter, a method for data transmission and a method for data recovery through the transmitter and the receiver will be described with reference to FIG. 7.

Figure 7:
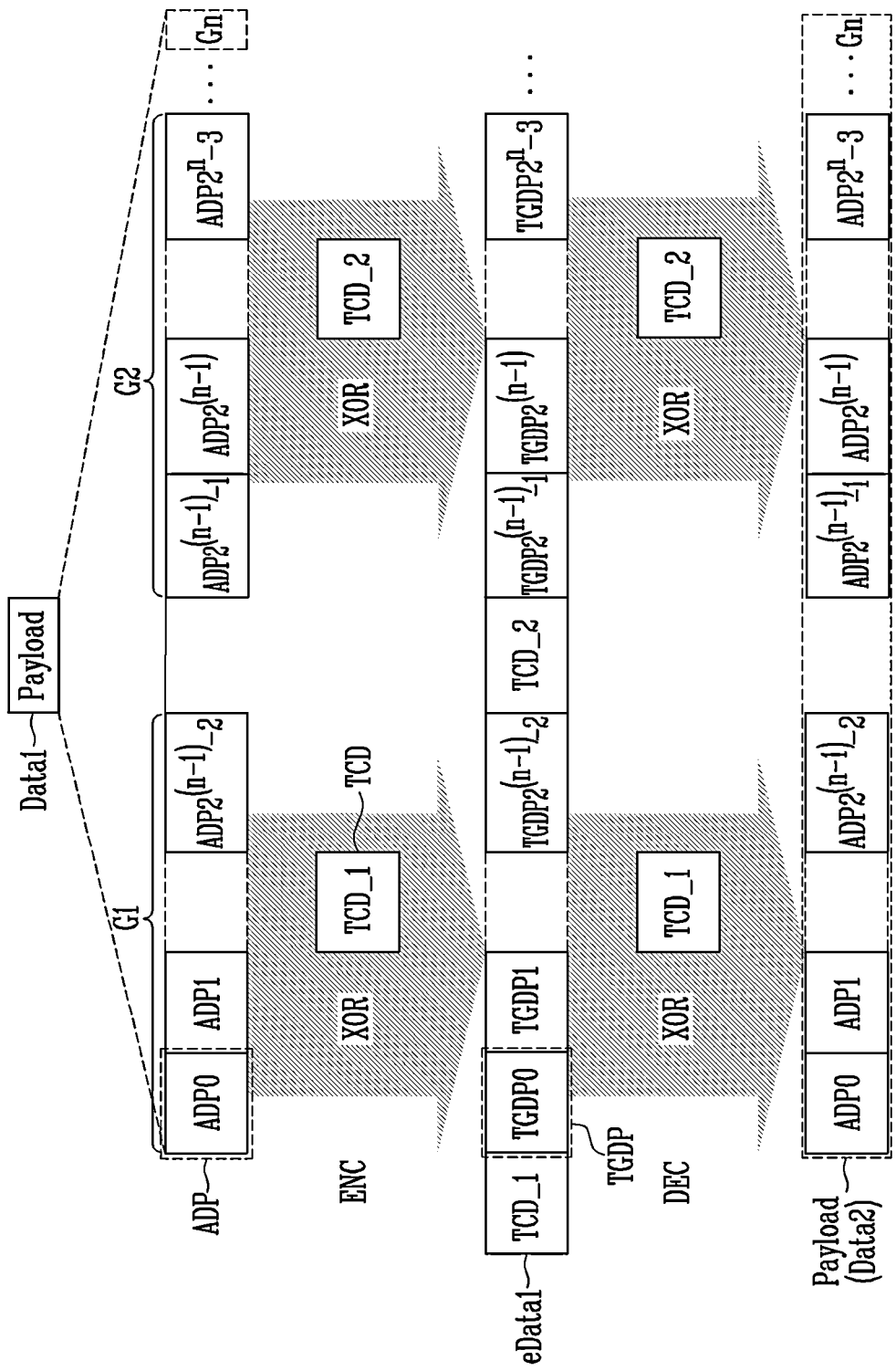
FIG. 7 is a diagram illustrating an embodiment of a method for data transmission and a method for data recovery in accordance with the invention.

FIG. 7 is a diagram illustrating an embodiment of a method for data transmission and a method for data recovery in accordance with the invention.

Referring to FIG. 7, in the method for data transmission in the embodiment of the invention, first, the encoder ENC may divide first data Data1 into data packets ADP. Also, the encoder ENC may divide the first data Data1 into a plurality of packet groups G1 and G2 to Gn. Here, n may be a natural number greater than one.

The plurality of packet groups G1 and G2 to Gn may include data packets ADP. One data packet ADP may consist of n-bit data. Accordingly, a number of data packets ADP included in one data packet group G1 may be $2^{(n-1)}-1$ when one data packet ADP consists of n-bit data. In an embodiment, the one data packet ADP may consist of 6-bit data, and the number of data packets ADP included in the one data packet group G1 may be 31. Specifically, a first data packet group G1 may include zeroth and first to $(2^{(n-1)}-2)$th data packets ADP0 and ADP1 to ADP$2^{(n-1)}-2$, and a second data packet group G2 may include $(2^{(n-1)}-1)$th and $(2^{(n-1)})$th to $(2^n-3)$th data packets ADP$2^{(n-1)}-1$ and ADP$2^{(n-1)}$ to ADP$2^n-3$. However, the invention is not limited thereto, and the number of data packets ADP may be variously changed in some embodiments.

Subsequently, the encoder ENC may select one transition acceleration data TCD among transition acceleration data preliminary packets TCDB (hereinafter, with reference to FIGS. 8 to 10).

The transition acceleration data preliminary packets TCDB may include all transition acceleration data TCD which can be formed with n bits. A number of the transition acceleration data preliminary packets TCDB may be $2^{(n-1)}$ when one data packet ADP consists of n-bit data. In an embodiment, when the one data packet ADP consists of 6-bit data, the number of the transition acceleration data preliminary packets TCDB may be 32. However, the invention is not limited thereto, and the number of the transition acceleration data preliminary packets TCDB may be variously changed in some embodiments.

In an embodiment, the encoder ENC may remove transition acceleration data preliminary packets equal or complementary to the data packet ADP among the transition acceleration data preliminary packets TCDB, and select transition acceleration data TCD among remaining transition acceleration data preliminary packets TCDB. That is, in an embodiment, the transition acceleration data TCD may not be equal or complementary to the data packet ADP. In an embodiment, when one data packet ADP consisting of 6-bit data is $000000_{(2)}$, the encoder ENC may remove transition acceleration data preliminary packets equal or complementary to the data packet ADP among the transition acceleration data preliminary packets TCDB having 0 to 31, and select $000001_{(2)}$ as a value as smallest as possible among remaining transition acceleration data preliminary packets TCDB, for example.

Also, in an embodiment, when the encoder ENC selects transition acceleration data TCD, the encoder ENC may select transition acceleration data TCD different from previous transition acceleration data TCD among the transition acceleration data preliminary packets TCDB. In an embodiment, when the encoder ENC selects subsequent transition acceleration data TCD among the transition acceleration data preliminary packets TCDB, the encoder ENC may select transition acceleration data TCD which is not consecutive to the previous transition acceleration data TCD. In an embodiment, first transition acceleration data TCD_1 may be selected in the first data packet group G1, and second transition acceleration data TCD_2 may be selected in the second data packet group G2, for example. In an embodiment, a method in which the encoder ENC selects transition acceleration data TCD may be variously changed. This will be described in detail with reference to FIGS. 8 to 10 which will be described later.

In an embodiment, when transition acceleration data TCD is selected, transition acceleration data TCD different from previous transition acceleration data TCD may be selected among the transition acceleration data preliminary packets TCDB, and thus an electro-magnetic interference ("EMI") phenomenon may be reduced.

The encoder ENC may generate transition guarantee data packets TGDP by performing an operation on one data packet group G1 among the data packet groups G1 and G2 to Gn and one transition acceleration data TCD. The one data packet group G1 may include predetermined data packets ADP among the data packets ADP. In an embodiment, the operation may be an exclusive OR ("XOR") gate operation. That is, the encoder ENC may generate the transition guarantee data packets TGDP by performing the XOR gate operation on the one data packet group G1 and the transition acceleration data TCD. In an embodiment, when the XOR gate operation is performed on one data packet ADP having data of 000000(2) among the data pack groups and transition acceleration data TCD having data of $000001_{(2)}$, a transition guarantee data packet TGDP having the data of $000001_{(2)}$ may be generated, for example.

Since transition guarantee data packets TGDP are generated by performing an operation on corresponding data packets ADP and one transition acceleration data TCD, the transition guarantee data packets TGDP may be generated to have a number equal to a number of the data packets ADP. In an embodiment, when one data packet ADP consists of n-bit data, the number of the transition guarantee data packets TGDP may be $2^{(n-1)}$, for example. In an embodiment, one data packet ADP may consist of 6-bit data, and a number of transition guarantee data packets TGDP corresponding to the one data packet group G1 may be 32. In an embodiment, transition guarantee data packets TGDP corresponding to the first data packet group G1 may correspond to zeroth and first to $(2^{(n-1)}-1)$th transition guarantee data packet TGDP0 and TGDP1 to TGDP$2^{(n-1)}-1$, for example. In addition, transition guarantee data packets TGDP corresponding to the second data packet group G2 may correspond to $(2^{(n-1)})$th and $(2^{(n-1)}+1)$th to $(2^n-1)$th transition guarantee data packets TGDP$2^{(n-1)}$ and TGDP$2^{(n-1)}+1$ to TGDP$2^n-1$. However, the invention is not limited thereto, and the number of transition guarantee data packets TGDP may be variously changed in some embodiments.

The encoder ENC may transmit one transition acceleration data TCD and transition guarantee data packets TGDP.

The transition guarantee data packets TGDP generated corresponding to the plurality of data packet groups G1 and G2 to Gn may be transmitted to the receiver RXD (refer to FIG. 2) while being adjacent to each corresponding transition acceleration data TCD. In an embodiment, zeroth and first to $(2^{(n-1)}-1)$th transition guarantee data packets TGDP0 and TGDP1 to TGDP$2^{(n-1)}-1$ generated corresponding to the first data packet group G1 may be transmitted while being adjacent to the first transition acceleration data TCD_1 and the second transition acceleration data TCD_2, for example. In addition, $(2^{(n-1)})$th and $(2^{(n-1)}+1)$th to $(2^n-1)$th transition guarantee data packets TGDP$2^{(n-1)}$ and TGDP$2^{(n-1)}+1$ to TGDP$2^n-1$ generated corresponding to the second data packet group G2 may be transmitted while being adjacent to the second transition acceleration data TCD_2.

In the method for data recovery in the embodiment of the invention, the decoder DEC may receive one transition acceleration data TCD and transition guarantee data packets TGDP.

Subsequently, the decoder DEC may recover encoded data packets TGDP to the original data packet groups G1 and G2 to Gn by performing an operation on the transition guarantee data packets TGDP and one transition acceleration data TCD. In an embodiment, the operation may be an XOR gate method.

The transition guarantee data packets TGDP may be generated by performing the operation on the transition guarantee data packets TGDP and each corresponding transition acceleration data TCD, and be recovered to have a number equal to the number of the original data packets ADP. In an embodiment, the zeroth and first to $(2^{(n-1)}-1)$th transition guarantee data packets TGDP0 and TGDP1 to TGDP$2^{(n-1)}-1$ may be recovered to the zeroth and first to $(2^{(n-1)}-1)$th data packets ADP0 and ADP1 to ADP$2^{(n-1)}-1$ by performing the operation on the zeroth and first to $(2^{(n-1)}-1)$th transition guarantee data packets TGDP0 and TGDP1 to TGDP$2^{(n-1)}-1$ and the first transition acceleration data TCD_1, for example. In addition, the $(2^{(n-1)})$th and $(2^{(n-1)}+1)$th to $(2^n-1)$th transition guarantee data packets TGDP$2^{(n-1)}$ and TGDP$2^{(n-1)}+1$ to TGDP$2^n-1$ may be recovered to the $(2^{(n-1)})$th and $(2^{(n-1)}+1)$th to $(2^n-1)$th data packets ADP$2^{(n-1)}$ and ADP$2^{(n-1)}+1$ to ADP$2^n-1$ by performing the operation on the $(2^{(n-1)})$th and $(2^{(n-1)}+1)$th to $(2^n-1)$th transition guarantee data packets TGDP$2^{(n-1)}$ and TGDP$2^{(n-1)}+1$ to TGDP$2^n-1$ and the second transition acceleration data TCD_2. Accordingly, the decoder DEC may recover the second data Data2 to the first data Data1 including the original payload Payload.

Hereinafter, a method of selecting transition acceleration data among transition acceleration data preliminary packets will be described with reference to FIGS. 8 to 10.

Figure 8:
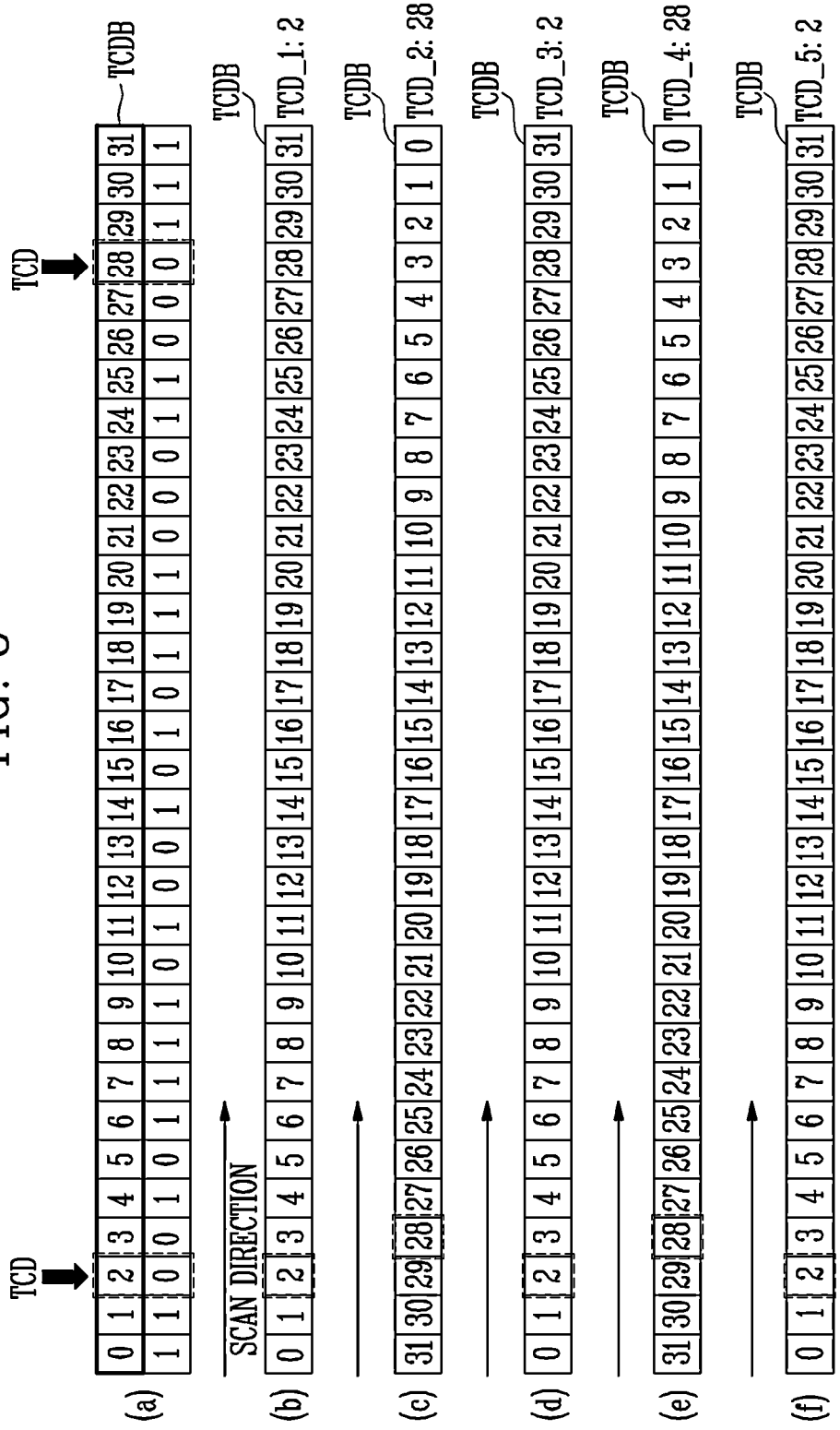
FIGS. 8 to 10 are diagrams illustrating an embodiment of a method of selecting transition acceleration data among transition acceleration data preliminary packets for the purpose of data transmission in accordance with the invention.
Figure 9:
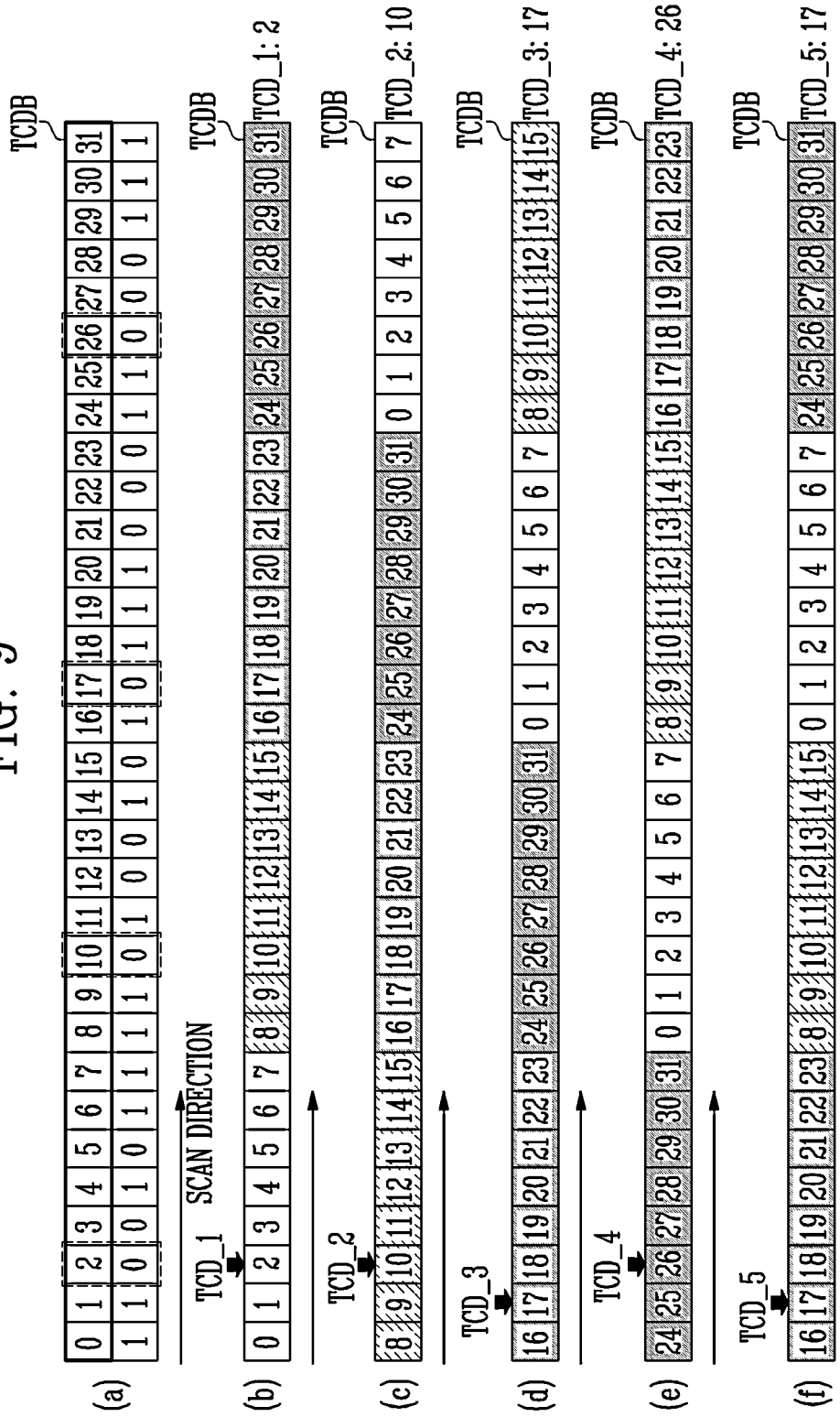
Figure 10:
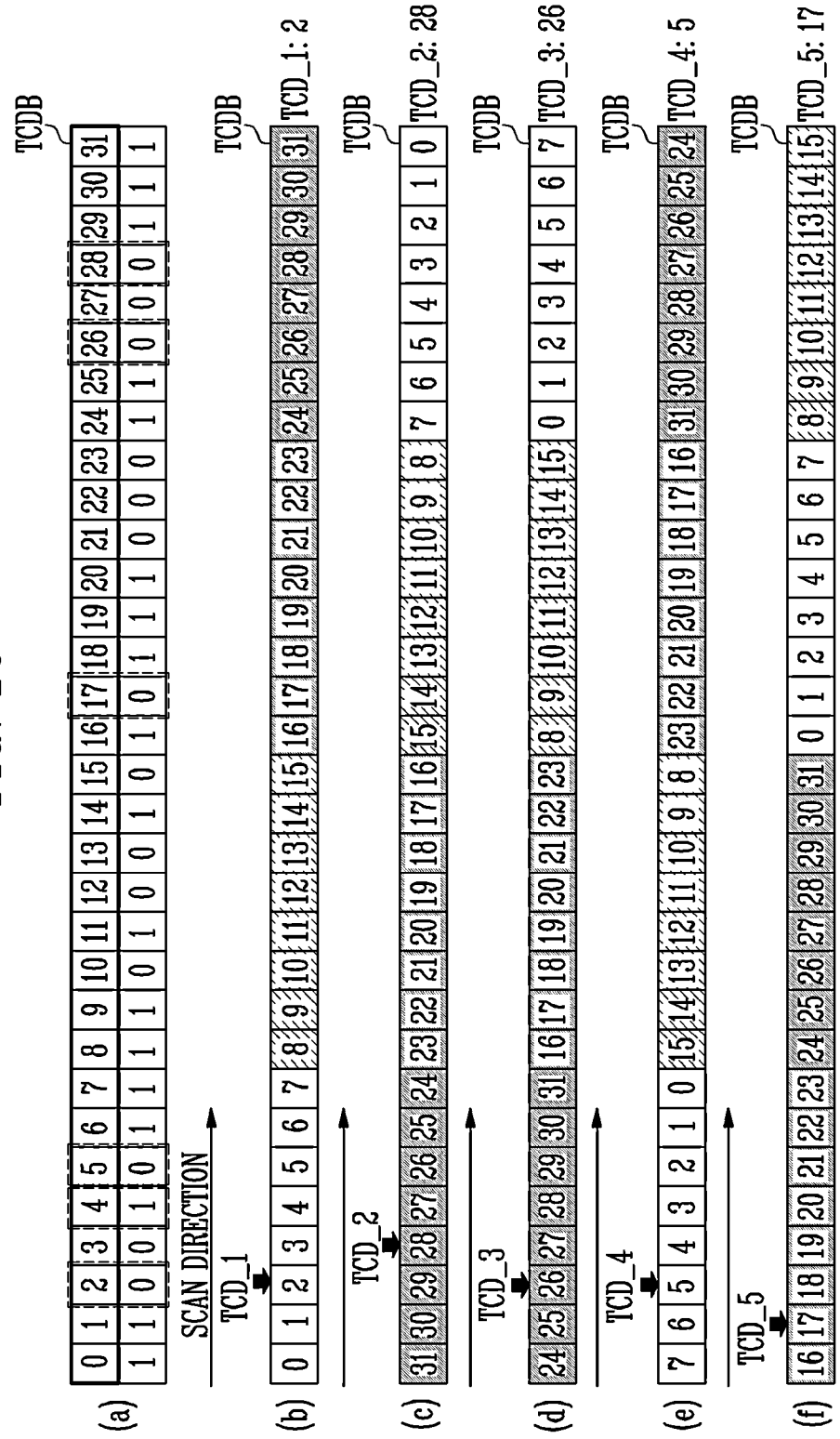

FIGS. 8 to 10 are diagrams illustrating an embodiment of a method of selecting transition acceleration data among transition acceleration data preliminary packets for the purpose of data transmission in accordance with the invention.

In FIGS. 8 to 10, a scan order for selecting a transition acceleration data preliminary packet TCDB and transition acceleration data TCD for the purpose of data transmission is illustrated. In FIGS. 8 to 10, transition acceleration data preliminary packets TCDB possible when the data packet ADP (refer to FIG. 7) consists of 6-bit data are illustrated as decimal numbers from 0 to 31 at a table portion indicated as (a). In addition, at the table portion indicated as (a), a case which may be selected as transition acceleration data TCD is illustrated as a number of 0 and a case which cannot be selected as any transition acceleration data TCD is illustrated as a number of 1, at the bottom of the transition acceleration data preliminary packets TCDB. In FIGS. 8 to 10, table portions indicated as (b) to (f) illustrate scan orders for selecting transition acceleration data TCD. Specifically, the table portions indicated as (b) to (f) illustrate scan orders for selecting transition acceleration data TCD corresponding to first to fifth data packet groups. In an embodiment, a transition acceleration data preliminary packet TCDB which may be selected for the first time may be selected as transition acceleration data TCD according to a scan order.

Referring to FIG. 8, in an embodiment, the encoder ENC (refer to FIG. 7) may scan the transition acceleration data preliminary packets TCDB in an ascending order or a descending order so as to select transition acceleration data TCD corresponding to the consecutive data packet groups G1 and G2 to G7 (refer to FIG. 7). In an embodiment, when the encoder ENC selects next transition acceleration data TCD among the transition acceleration data preliminary packets TCDB, the encoder ENC may select transition acceleration data TCD which is not consecutive to previous transition acceleration data TCD. That is, transition acceleration data TCD which are not consecutive to each other may be the same.

As shown in (b), (d), and (f) of FIG. 8, in an embodiment, the encoder ENC may scan the transition acceleration data preliminary packets TCDB in an order (i.e., an ascending order) from a transition acceleration data preliminary packet TCDB having a small value to a transition acceleration data preliminary packet TCDB having a large value among the transition acceleration data preliminary packets TCDB. That is, the encoder ENC may scan the transition acceleration data preliminary packets TCDB in an order from a transition acceleration data preliminary packet TCDB having 0 to a transition acceleration data preliminary packet TCDB having 31. Accordingly, since a case where transition acceleration data TCD may be selected for the first time among 0 to 31 corresponds to $2_{(10)}$, the encoder ENC may select $2_{(10)}$ as the transition acceleration data TCD. That is, the transition acceleration data TCD may correspond to $000010_{(2)}$ in 6 bits. Therefore, first transition acceleration data TCD_1 corresponding to the first data packet group may correspond to $000010_{(2)}$, third transition acceleration data TCD_3 corresponding to the third data packet group may correspond to $000010_{(2)}$, and fifth transition acceleration data TCD_5 corresponding to the fifth data packet group may correspond to $000010_{(2)}$.

In addition, as shown in (c) and (e) of FIG. 8, in an embodiment, the encoder ENC may scan the transition acceleration data preliminary packets TCDB in an order (i.e., a descending order) from a transition acceleration data preliminary packet TCDB having a large value to a transition acceleration data preliminary packet TCDB having a small value among the transition acceleration data preliminary packets TCDB. That is, the encoder ENC may scan the transition acceleration data preliminary packets TCDB in an order from the transition acceleration data preliminary packet TCDB having 31 to the transition acceleration data preliminary packet TCDB having 0. Accordingly, since a case where transition acceleration data TCD may be selected for the first time among 31 to 0 corresponds to $28_{(10)}$, the encoder ENC may select $28_{(10)}$ as the transition acceleration data TCD. That is, the transition acceleration data TCD may correspond to $000010_{(2)}$ in 6 bits. Therefore, second transition acceleration data TCD_2 corresponding to the second data packet group may correspond to $011100_{(2)}$, and fourth transition acceleration data TCD_4 corresponding to the fourth data packet group may correspond to $011100_{(2)}$.

Referring to FIG. 9, in an embodiment, the encoder ENC may group the transition acceleration data preliminary packets TCDB into groups each including k transition acceleration data preliminary packets TCDB, align the grouped transition acceleration data preliminary packets TCDB in a predetermined order, and then scan the aligned transition acceleration data preliminary packets TCDB so as to select transition acceleration data TCD corresponding to the consecutive data packet groups G1 and G2 to G7. When the grouped transition acceleration data preliminary packets TCDB are aligned in the predetermined order, the encoder ENC may regularly align the grouped transition acceleration data preliminary packets TCDB according to a predetermined order, and randomly align the grouped transition acceleration data preliminary packets TCDB. The number with which the transition acceleration data preliminary packets TCDB are grouped may be variously set by considering a number of the transition acceleration data preliminary packets TCDB. In an embodiment, the transition acceleration data preliminary packets TCDB may be grouped into four groups each including eight transition acceleration data preliminary packets TCDB. However, the invention is not limited thereto, and the number with which the transition acceleration data preliminary packets TCDB are grouped may be variously changed in some embodiments.

As shown in (b) of FIG. 9, in an embodiment, the encoder ENC may scan the transition acceleration data preliminary packets TCDB along a scan direction shown in (b) of FIG. 9. Since the transition acceleration data preliminary packets TCDB are grouped into four groups and are located in an order from 0 to 31, a case where transition acceleration data TCD may be selected for the first time along a predetermined scan direction may correspond to $2_{(10)}$. That is, the transition acceleration data TCD may correspond to $000010_{(2)}$ in six bits. Therefore, first transition acceleration data TCD_1 corresponding to the first data packet group may correspond to $000010_{(2)}$.

As shown in (c) of FIG. 9, the transition acceleration data preliminary packets TCDB are grouped into four groups, and are set as four groups including 8 to 15, 16 to 23, 24 to 31, and 0 to 7, which are sequentially located. Hence, a case where transition acceleration data TCD may be selected for the first time along a predetermined scan direction may correspond to $10_{(10)}$. That is, the transition acceleration data TCD may correspond to $001010_{(2)}$ in six bits. Therefore, second transition acceleration data TCD_2 corresponding to the second data packet group may correspond to $001010_{(2)}$.

As shown in (d) of FIG. 9, the transition acceleration data preliminary packets TCDB are grouped into four groups, and are set as four groups including 16 to 23, 24 to 31, 0 to 7, and 8 to 15, which are sequentially located. Hence, a case where transition acceleration data TCD may be selected for the first time along a predetermined scan direction may correspond to $17_{(10)}$. That is, the transition acceleration data TCD may correspond to $010001_{(2)}$ in six bits. Therefore, third transition acceleration data TCD_3 corresponding to the third data packet group may correspond to $010001_{(2)}$.

As shown in (e) of FIG. 9, the transition acceleration data preliminary packets TCDB are grouped into four groups, and are set as four groups including 24 to 31, 0 to 7, 8 to 15, and 16 to 23, which are sequentially located. Hence, a case where transition acceleration data TCD may be selected for the first time along a predetermined scan direction may correspond to $26_{(10)}$. That is, the transition acceleration data TCD may correspond to $011010_{(2)}$ in six bits. Therefore, fourth transition acceleration data TCD_4 corresponding to the fourth data packet group may correspond to $011010_{(2)}$.

As shown in (f) of FIG. 9, the transition acceleration data preliminary packets TCDB are grouped into four groups, and are set as four groups including 16 to 23, 8 to 15, 0 to 7, and 24 to 31, which are sequentially located. Hence, a case where transition acceleration data TCD may be selected for the first time along a predetermined scan direction may correspond to $17_{(10)}$. That is, the transition acceleration data TCD may correspond to $010001_{(2)}$ in six bits. Therefore, fifth transition acceleration data TCD_5 corresponding to the fifth data packet group may correspond to $010001_{(2)}$.

Referring to FIG. 10, in an embodiment, the encoder ENC may group the transition acceleration data preliminary packets TCDB into groups each including k transition acceleration data preliminary packets TCDB, align the grouped transition acceleration data preliminary packets TCDB in a predetermined order, and then scan the aligned transition acceleration data preliminary packets TCDB in an order (i.e., a descending order) from a transition acceleration data preliminary packet TCDB having a large value to a transition acceleration data preliminary packet TCDB having a small value so as to select transition acceleration data TCD corresponding to the consecutive data packet groups G1 and G2 to G7. Also, the encoder ENC may group the transition acceleration data preliminary packets TCDB into groups each including k transition acceleration data preliminary packets TCDB, align the grouped transition acceleration data preliminary packets TCDB in a predetermined order, and then scan the aligned transition acceleration data preliminary packets TCDB in an order (i.e., an ascending order) from a transition acceleration data preliminary packet TCDB having a small value to a transition acceleration data preliminary packet TCDB having a large value. The number with which the transition acceleration data preliminary packets TCDB are grouped may be variously set by considering a number of the transition acceleration data preliminary packets TCDB. In an embodiment, the transition acceleration data preliminary packets TCDB may be grouped into four groups each including eight transition acceleration data preliminary packets TCDB. However, the invention is not limited thereto, and the number with which the transition acceleration data preliminary packets TCDB are grouped may be variously changed in some embodiments.

As shown in (b) of FIG. 10, the transition acceleration data preliminary packets TCDB are grouped into four groups, and are scanned in an ascending order from 0 to 31. Hence, a case where transition acceleration data TCD may be selected for the first time along a predetermined scan direction may correspond to $2_{(10)}$. That is, the transition acceleration data TCD may correspond to $000010_{(2)}$ in six bits. Therefore, first transition acceleration data TCD_1 corresponding to the first data packet group G1 (refer to FIG. 7) may correspond to $000010_{(2)}$.

As shown in (c) of FIG. 10, the transition acceleration data preliminary packets TCDB are grouped into four groups, and are scanned in a descending order from 31 to 0. Hence, a case where transition acceleration data TCD may be selected for the first time along a predetermined scan direction may correspond to $28_{(10)}$. That is, the transition acceleration data TCD may correspond to $011100_{(2)}$ in six bits. Therefore, second transition acceleration data TCD_2 corresponding to the second data packet group G2 (refer to FIG. 7) may correspond to $011100_{(2)}$.

As shown in (d) of FIG. 10, the transition acceleration data preliminary packets TCDB are grouped into four groups including 24 to 31, 16 to 23, 8 to 15, and 0 to 7, which are sequentially located, and are scanned in an ascending order. Hence, a case where transition acceleration data TCD may be selected for the first time along a predetermined scan direction may correspond to $26_{(10)}$. That is, the transition acceleration data TCD may correspond to $011010_{(2)}$ in six bits. Therefore, third transition acceleration data TCD_3 corresponding to the third data packet group may correspond to $011010_{(2)}$.

As shown in (e) of FIG. 10, the transition acceleration data preliminary packets TCDB are grouped into four groups including 7 to 0, 15 to 8, 23 to 16, and 31 to 24, which are sequentially located, and are scanned in a descending order. Hence, a case where transition acceleration data TCD may be selected for the first time along a predetermined scan direction may correspond to $5_{(10)}$. That is, the transition acceleration data TCD may correspond to $000101_{(2)}$ in six bits. Therefore, fourth transition acceleration data TCD_4 corresponding to the fourth data packet group may correspond to $000101_{(2)}$.

As shown in (f) of FIG. 10, the transition acceleration data preliminary packets TCDB are grouped into four groups including 16 to 23, 24 to 31, 0 to 7, and 8 to 15, which are sequentially located, and are scanned in an ascending order. Hence, a case where transition acceleration data TCD may be selected for the first time along a predetermined scan direction may correspond to $17_{(10)}$. That is, the transition acceleration data TCD may correspond to $010001_{(2)}$ in six bits. Therefore, fifth transition acceleration data TCD_5 corresponding to the fifth data packet group may correspond to $010001_{(2)}$.

That is, in an embodiment, when the encoder ENC selects transition acceleration data TCD, the encoder ENC may select transition acceleration data TCD different from previous transition acceleration data TCD among the transition acceleration data preliminary packets TCDB. Thus, an EMI phenomenon may be reduced in data transmission.

Hereinafter, a method for data transmission and a method for data recovery in an embodiment of the invention will be described with reference to FIGS. 11 and 12.

Figure 11:
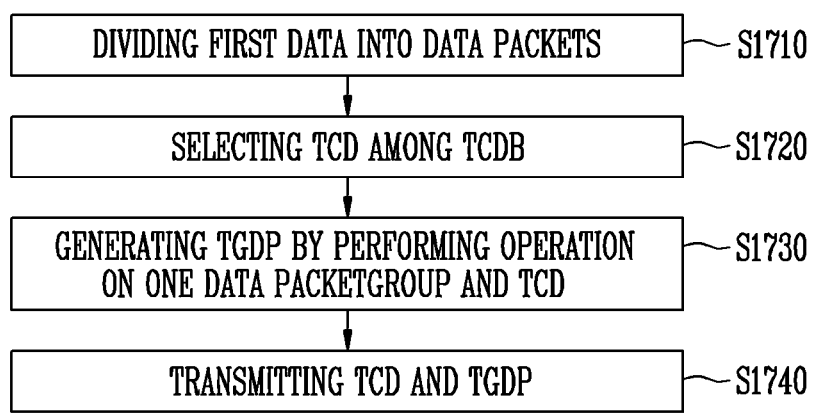
FIG. 11 is a diagram illustrating an embodiment of a method for data transmission in accordance with the invention.

FIG. 11 is a diagram illustrating an embodiment of a method for data transmission in accordance with the invention. FIG. 12 is a diagram illustrating an embodiment of a method for data recovery in accordance with the invention. Hereinafter, FIGS. 11 and 12 will be described with reference to FIGS. 7 to 10 together.

Referring to FIG. 11, the method for data transmission may include an operation S1710 of dividing first data Data1 into data packets ADP, an operation S1720 of selecting one transition acceleration data TCD among transition acceleration data preliminary packets TCDB, an operation 1730 of generating transition guarantee data packets TGDP by performing an operation on one data packet group among a plurality of data packet groups G1 and G2 to Gn and one transition acceleration data TCD, and an operation S1740 of transmitting one transition acceleration data TCD1 and the transition guarantee data packet TGDP.

Specifically, the method for data transmission in the embodiment of the invention may include an operation of selecting first transition acceleration data TCD_1 among transition acceleration data preliminary packets TCDB, after first data Data1 is divided into data packets ADP, an operation of generating a first transition guarantee data packet TGDP by performing an operation on a first data packet group G1 including predetermined data packets among the data packets ADP and the first transition acceleration data TCD_1, an operation of transmitting the first transition acceleration data TCD_1 and the first transition guarantee data packet TGDP, an operation of generating a second transition guarantee data packet TGDP by performing an operation on a second data packet group G2 including predetermined data packets among the data packets ADP and second transition acceleration data TCD_2, and an operation of transmitting the second transition acceleration data TCD_2 and the second transition guarantee data packet TGDP. The first transition acceleration data TCD_1 and the second transition acceleration data TCD_2 may be different data.

In an embodiment, in the operation S1720 of selecting the one transition acceleration data TCD among the transition acceleration data preliminary packets TCDB, the encoder ENC (refer to FIG. 1) may select transition acceleration data TCD which may be selected for the first time among the transition acceleration data preliminary packets TCDB by scanning the transition acceleration data preliminary packets TCDB.

The encoder ENC may scan the transition acceleration data preliminary packets TCDB in an order from a transition acceleration data preliminary packet TCDB having a small value to a transition acceleration data preliminary packet TCDB having a large value.

Also, the encoder ENC may scan the transition acceleration data preliminary packets TCDB in an order from a transition acceleration data preliminary packet TCDB having a large value to a transition acceleration data preliminary packet TCDB having a small value.

The encoder ENC may group the transition acceleration data preliminary packets TCDB, align the grouped transition acceleration data preliminary packets TCDB in a predetermined order, and then scan the aligned transition acceleration data preliminary packets TCDB. The predetermined order may be variously set regardless of the magnitudes of values of the transition acceleration data preliminary packets TCDB.

The encoder ENC may group the transition acceleration data preliminary packets TCDB, align the grouped transition acceleration data preliminary packets TCDB in a predetermined order, and then scan the aligned transition acceleration data preliminary packets TCDB in an order from a transition acceleration data preliminary packet TCDB having a small value to a transition acceleration data preliminary packet TCDB having a large value.

Also, the encoder ENC may group the transition acceleration data preliminary packets TCDB, align the grouped transition acceleration data preliminary packets TCDB in a predetermined order, and then scan the aligned transition acceleration data preliminary packets TCDB in an order from a transition acceleration data preliminary packet TCDB having a large value to a transition acceleration data preliminary packet TCDB having a small value.

That is, in an embodiment, when transition acceleration data TCD is selected, the transition acceleration data preliminary packets TCDB are variously located, and a scan order of the transition acceleration data preliminary packets TCDB. Accordingly, transition acceleration data TCD different from previous transition acceleration data TCD among the transition acceleration data preliminary packets TCDB may be selected, and thus an EMI phenomenon may be reduced.

Figure 12:
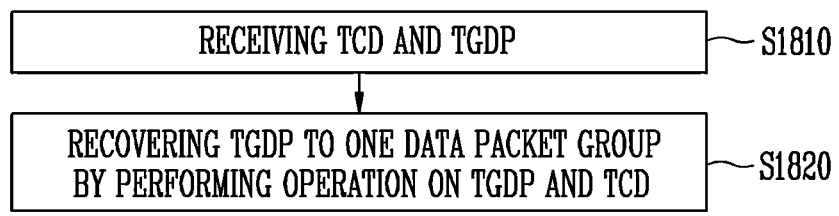
FIG. 12 is a diagram illustrating an embodiment of a method for data recovery in accordance with the invention.

Referring to FIG. 12, the method for data recovery in the embodiment of the invention may include an operation S1810 of receiving one transition acceleration data TCD and transition guarantee data packets TGDP and an operation S1820 of recovering encoded data to the original data packet group by performing an operation on the transition guarantee data packets TGDP and the one transition acceleration data TCD, so as to recover second data Data2 to the first data Data1.

In an embodiment, the decoder DEC (refer to FIG. 1) may receive one transition acceleration data TCD and transition guarantee data packets TGDP from the encoder ENC.

Subsequently, the decoder DEC may recover encoded data to the original data packet group by performing an operation on the transition guarantee data packets TGDP and the one transition acceleration data TCD. In an embodiment, the operation may be an XOR gate operation. That is, the decoder DEC may recover encoded data to the original data packet group by performing an XOR gate operation on the transition guarantee data packets TGDP and the one transition acceleration data TCD.

In accordance with the invention, when transition acceleration data is selected, transition acceleration data different from previous transition acceleration data among transition acceleration data preliminary packets may be selected. Thus, an EMI phenomenon may be reduced in data transmission.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A method for data transmission, the method comprising:
   dividing first data into data packets;
   selecting transition acceleration data among transition acceleration data preliminary packets, the transition acceleration data being different from previous transition acceleration data immediately preceding the transition acceleration data in the transition acceleration data preliminary packets;
   generating transition guarantee data packets by performing an operation on a data packet group including predetermined data packets among the data packets and the transition acceleration data; and
   transmitting the transition acceleration data and the transition guarantee data packets,
   wherein transition acceleration data which is firstly selectable among the transition acceleration data preliminary packets along a predetermined scan direction is selected by scanning the transition acceleration data preliminary packets, and
   wherein the transition acceleration data preliminary packets are scanned in an order from a transition acceleration data preliminary packet having a smallest value among the transition acceleration data preliminary packets to a transition acceleration data preliminary packet having a largest value among the transition acceleration data preliminary packets.

2. The method of claim 1, wherein the transition acceleration data preliminary packets include all transition acceleration data which are represented by n bits where n is a natural number greater than one.

3. The method of claim 1, wherein the transition acceleration data preliminary packets are scanned in an order from a transition acceleration data preliminary packet having a largest value among the transition acceleration data preliminary packets to a transition acceleration data preliminary packet having a smallest value among the transition acceleration data preliminary packets.

4. The method of claim 1, wherein the transition acceleration data preliminary packets are grouped, the grouped transition acceleration data preliminary packets are aligned in a predetermined order, and then the aligned transition acceleration data preliminary packets are scanned.

5. The method of claim 1, wherein the transition acceleration data preliminary packets are grouped, the grouped transition acceleration data preliminary packets are aligned in a predetermined order, and then the aligned transition acceleration data preliminary packets are scanned in an order from a transition acceleration data preliminary packet having a smallest value in a group of the transition acceleration data preliminary packets to a transition acceleration data preliminary packet having a largest value in the group of the transition acceleration data preliminary packets.

6. The method of claim 1, wherein the transition acceleration data preliminary packets are grouped, the grouped transition acceleration data preliminary packets are aligned in a predetermined order, and then the aligned transition acceleration data preliminary packets are scanned in an order from a transition acceleration data preliminary packet having a largest value in a group of the transition acceleration data preliminary packets to a transition acceleration data preliminary packet having a smallest value in the group of the transition acceleration data preliminary packets.

7. The method of claim 1, wherein the transition guarantee data packets are generated by performing an exclusive OR gate operation on the data packet group and the transition acceleration data.

8. The method of claim 1, wherein the transition acceleration data is not equal and complementary to the data packets.

9. A method for data transmission, the method comprising:
   dividing first data into data packets;
   selecting first transition acceleration data among transition acceleration data preliminary packets;
   generating first transition guarantee data packets by performing an operation on a first data packet group including predetermined data packets among the data packets and the first transition acceleration data;
   transmitting the first transition acceleration data and the first transition guarantee data packets;
   selecting second transition acceleration data among the transition acceleration data preliminary packets;
   generating second transition guarantee data packets by performing an operation on a second data packet group including predetermined data packets among the data packets and the second transition acceleration data; and
   transmitting the second transition acceleration data and the second transition guarantee data packets,
   wherein transition acceleration data which is firstly selectable among the transition acceleration data preliminary packets along a predetermined scan direction is selected by scanning the transition acceleration data preliminary packets, and
   wherein the first transition acceleration data is selected by scanning the transition acceleration data preliminary packets in an order from a transition acceleration data preliminary packet having a smallest value among the transition acceleration data preliminary packets to a transition acceleration data preliminary packet having a largest value among the transition acceleration data preliminary packets.

10. The method of claim 9, wherein the first transition acceleration data and the second transition acceleration data are different from each other.

11. The method of claim 9, wherein the second transition acceleration data is selected by scanning the transition acceleration data preliminary packets in an order from a transition acceleration data preliminary packet having a largest value among the transition acceleration data preliminary packets to a transition acceleration data preliminary packet having a smallest value among the transition acceleration data preliminary packets.

12. The method of claim 9, wherein the transition acceleration data preliminary packets are grouped, the grouped transition acceleration data preliminary packets are aligned in a predetermined order, and then the aligned transition acceleration data preliminary packets are scanned.

13. The method of claim 12, wherein, in the aligned transition acceleration data preliminary packets, the first transition acceleration data is selected by scanning the transition acceleration data preliminary packets in an order from a transition acceleration data preliminary packet having a smallest value in a first group of the transition acceleration data preliminary packets to a transition acceleration data preliminary packet having a largest value in the first group of the transition acceleration data preliminary packets.

14. The method of claim 13, wherein, in the aligned transition acceleration data preliminary packets, the second transition acceleration data is selected by scanning the transition acceleration data preliminary packets in an order from a transition acceleration data preliminary packet having a largest value in a second group of the transition acceleration data preliminary packets to a transition acceleration data preliminary packet having a smallest value in the second group of the transition acceleration data preliminary packets.

15. The method of claim 9, wherein a number of the transition acceleration data preliminary packets is $2^{(n-1)}$, when one data packet among the data packets consists of n-bit data where n is a natural number greater than one.

16. The method of claim 9, wherein a number of the data packets included in one data packet group among the first and second data packet groups is $2^{(n-1)}-1$, when one data packet among the data packets consists of n-bit data where n is a natural number greater than one.

* * * * *